United States Patent
Maric et al.

(10) Patent No.: US 6,764,802 B2
(45) Date of Patent: Jul. 20, 2004

(54) CHEMICAL AGGREGATION PROCESS USING INLINE MIXER

(75) Inventors: Milan Maric, Hamilton (CA); Alan E. J. Toth, Burlington (CA); Thomas E. Enright, Tottenham (CA); Marko D. Saban, Etobicoke (CA)

(73) Assignee: Xerox Corporation, Stamford, CT (US)

( * ) Notice: Subject to any disclaimer, the term of this patent is extended or adjusted under 35 U.S.C. 154(b) by 167 days.

(21) Appl. No.: 10/208,372

(22) Filed: Jul. 29, 2002

(65) Prior Publication Data

US 2004/0018441 A1 Jan. 29, 2004

(51) Int. Cl.$^7$ .............................. G03G 9/08; C08J 3/215
(52) U.S. Cl. ................... 430/137.14; 523/333; 523/335
(58) Field of Search ..................... 430/137.14; 523/333, 523/335

(56) References Cited

U.S. PATENT DOCUMENTS

| | | | |
|---|---|---|---|
| 5,348,832 A | 9/1994 | Sacripante et al. | ......... 430/109 |
| 5,593,807 A | 1/1997 | Sacripante et al. | ......... 430/137 |
| 5,660,965 A | 8/1997 | Mychajlowskij et al. | ... 430/137 |
| 5,723,252 A | 3/1998 | Patel et al. | .................. 430/137 |
| 5,910,595 A | 6/1999 | Durrwachter | ............ 548/300.7 |
| 5,945,245 A | 8/1999 | Mychajlowskij et al. | ... 430/137 |
| 5,994,020 A | 11/1999 | Patel et al. | .................. 430/137 |
| 6,143,457 A | 11/2000 | Carlini et al. | ................ 430/110 |
| 6,395,445 B1 | 5/2002 | Toth et al. | ............. 430/137.14 |
| 6,440,627 B2 * | 8/2002 | Shoji et al. | .............. 430/108.1 |

* cited by examiner

*Primary Examiner*—John Goodrow
(74) *Attorney, Agent, or Firm*—Zosan S. Soong

(57) ABSTRACT

A process including:
- agitating a mixture including a liquid and a plurality of resin particles within a vessel at a first shear condition;
- circulating a portion of the mixture from the vessel through a mixer;
- adding not all at once an aggregating agent for the resin particles and mixing the aggregating agent with the circulating mixture portion within the mixer at a second shear condition more intensive than the first shear condition to result in a post-mixer circulating composition; and
- returning the post-mixer circulating composition to the vessel wherein the post-mixer circulating composition undergoes the agitating at the first shear condition.

16 Claims, 1 Drawing Sheet

CHEMICAL AGGREGATION PROCESS USING INLINE MIXER

BACKGROUND OF THE INVENTION

Numerous processes are known for the preparation of toners, such as, for example, conventional polyester processes wherein a resin is melt kneaded or extruded with a pigment, micronized and pulverized to provide toner particles of the desired volume average particle diameter and geometric size distribution. In such processes, wherein large materials are mechanically reduced in size to achieve the desired smaller toner particles, it is usually necessary to subject the aforementioned toners to a classification procedure such that the desired size and geometric size distribution are attained.

As an improvement to the foregoing mechanical reduction processes, processes are known in which the toner is achieved via aggregation as opposed to particle size reduction. For example, chemical aggregation processes for the preparation of toners are illustrated in a number of patents. In these methods, the toners are formed chemically in situ and do not require known pulverization and/or classification methods.

Methods for forming toners by the chemical aggregation process have included the process described in Toth et al., U.S. Pat. No. 6,395,445 B1, where the aggregating agent is added as a solution in water, particularly a dilute solution of the aggregating agent. While advantageous in embodiments, the use of a dilute solution of the aggregating agent may possibly limit the throughput in the reactor vessel due to the volume taken up by the solvent. Thus there is a need addressed by the present invention for new processes that can add the aggregating agent either alone or in a solution or mixture, thereby increasing the flexibility of the new processes in adding aggregating agents regardless whether such aggregating agents are dissolved or dispersed in a liquid.

Other documents that may be relevant to the present invention are the following:

Sacripante et al., U.S. Pat. No. 5,593,807;
Sacripante et al., U.S. Pat. No. 5,348,832;
Patel et al., U.S. Pat. No. 5,723,252;
Durrwachter, U.S. Pat. No. 5,910,595;
Mychajlowskij et al., U.S. Pat. No. 5,660,965;
Patel et al., U.S. Pat. No. 5,994,020;
Mychajlowskij et al., U.S. Pat. No. 5,945,245; and
Carlini et al., U.S. Pat. No. 6,143,457.

SUMMARY OF THE INVENTION

The present invention is accomplished in embodiments by providing a process comprising:

agitating a mixture including a liquid and a plurality of resin particles within a vessel at a first shear condition;

circulating a portion of the mixture from the vessel through a mixer;

adding not all at once an aggregating agent for the resin particles and mixing the aggregating agent with the circulating mixture portion within the mixer at a second shear condition more intensive than the first shear condition to result in a post-mixer circulating composition; and returning the post-mixer circulating composition to the vessel wherein the post-mixer circulating composition undergoes the agitating at the first shear condition.

There is further provided in embodiments a process comprising:

agitating a mixture including water, a plurality of resin particles, and a colorant within a vessel at a first shear condition;

circulating 100% by volume of the mixture from the vessel through a mixer;

adding not all at once an aggregating agent for the resin particles and mixing the aggregating agent with the circulating mixture portion within the mixer at a second shear condition more intensive than the first shear condition to result in a post-mixer circulating composition; and returning the post-mixer circulating composition to the vessel wherein the post-mixer circulating composition undergoes the agitating at the first shear condition.

DETAILED DESCRIPTION

Figure 1:
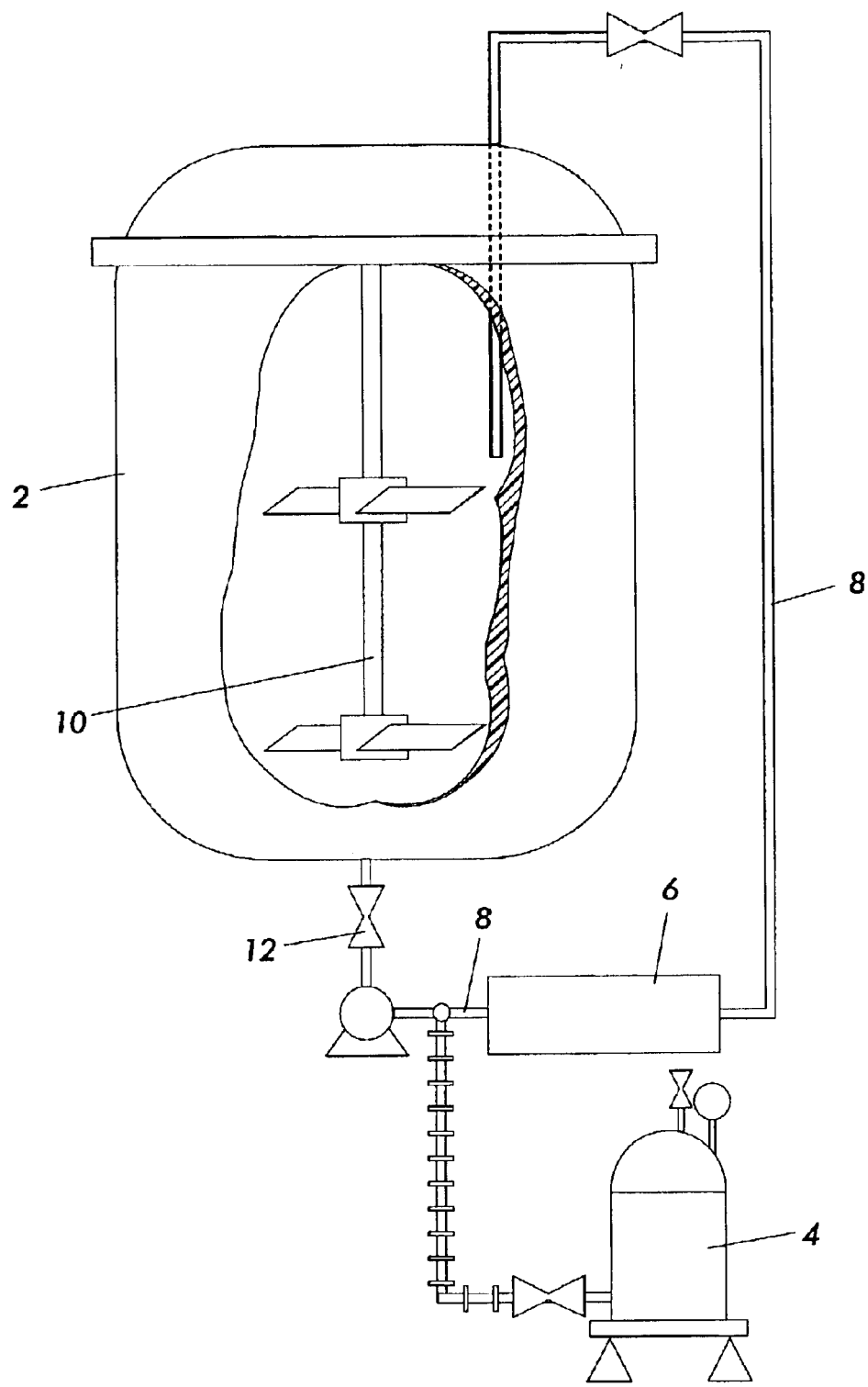
FIG. 1 represents a simplified illustration of one embodiment of equipment suitable for accomplishing the present process.

The present invention is generally directed to chemical aggregation processes involving the aggregation and coalescence of smaller component materials into larger composite particles. In embodiments, the present invention is directed to the economical chemical in situ preparation of particles without known pulverization and/or classification methods, and wherein in embodiments particles can be obtained with a volume average diameter of for example from about 1 to about 15 microns, from about 1 to about 10 microns, or from about 3 to about 7 microns, and narrow geometric size distribution ("GSD") of, for example, from about 1.10 to about 1.25, or from about 1.10 to about 1.20, as measured on the Coulter Counter.

Where the resulting particles are toner compositions, the resulting toners can be selected for known electrophotographic imaging, digital, printing processes, including color processes, and lithography. The toners obtained are especially useful for the development of colored images with excellent line and solid resolution, and wherein substantially no background deposits are present.

The materials produced by the present process may also be used for example as powders for coatings, particles for drug delivery, and as catalysts.

FIG. 1 represents exemplary equipment for accomplishing the present process where vessel 2 and aggregating agent tank 4 are operatively coupled to mixer 6 in a liquid circulation network 8. The vessel is equipped with stirring device 10 (depicted as agitator blades) and a valve 12. The valve is opened to allow a portion of the mixture to flow from the vessel to the mixer. Aggregating agent from the aggregating agent tank joins the flow of mixture into the mixer. The aggregating agent and the mixture are subjected to mixing within the mixer at the second shear condition to result in a post-mixer circulating composition (including both the mixture and the aggregating agent). The post-mixer circulating composition returns to the vessel. An optional pump may be used to facilitate flow of the mixture from the reactor to the mixer.

The present chemical aggregation process employs a first shear condition for a first period of time within a vessel and a second shear condition for a second period of time within a mixer, wherein the second shear condition is more intensive than the first shear condition and wherein the second period of time is shorter than the first period of time. In embodiments, the present invention results in a reduction in the amount of generated coarse/fouled material without affecting the particle growth time. The principle underlying the invention is that there is more thorough mixing of the aggregating agent with the charged sites on the resin particles. Consequently, the aggregating agent is distributed more uniformly among the resin particles and this results in less coarse material. If this thorough mixing was not accomplished, the aggregating agent would not be distributed uniformly with some resin particles having much more aggregating agent than others. This results in an uneven particle size distribution with more, large coarse particles.

The following illustrative parameters can be manipulated such that the second shear condition is more intensive than the first shear condition: mixing speed, flow rate of aggregating agent and the mixer type and geometry. For example, the mixer can be an in-line rotor-stator type homogenizer such as the IKA Dispax Reactor®, model DR 3-6/6A, which has a set of rotor-stator elements that can be arranged to provide more intensive mixing. The rotor-stator elements are provided as supercoarse, coarse, medium fine, superfine and neutral. The rotor-stator elements provide more intensive mixing as they become finer. A combination of rotor-stator elements may be used. For instance, in the order of entrance into the homogenizer, can be coarse, fine and superfine rotor-stator elements.

Regarding mixing speed, the first shear condition may include a mixing speed ranging for instance from about 100 rpm to about 1,000 rpm, or from about 500 rpm to about 800 rpm. The second shear condition may include a mixing speed ranging for example from about 6,000 rpm to about 10,000 rpm, or from about 7,000 rpm to about 8,000 rpm. In embodiments, the first shear condition includes a slower mixing speed and the second shear condition includes a faster mixing speed and wherein the difference in the mixing speeds ranges for example from about 3,000 rpm to about 10,000 rpm or from about 5,000 rpm to about 8,000 rpm.

In embodiments, the agitation within the vessel is stirring or shear effected by use of stirring impeller (agitator) blades in the vessel. The agitation may be conducted at from, for example, about 30–250 revolutions per minute or about 75 revolutions per minute at the 300 gal reactor scale to about 200–800 revolutions per minute or about 350 revolutions per minute at the 2 L reactor scale, the faster speeds applying to smaller reaction vessels. For example, the agitation in the vessel may be about 30–150 rpm for a 300 gallon reactor, about 80–200 rpm or about 110 rpm for a 30 gallon reactor, about 100–250 rpm or about 135 rpm for a 20 gallon reactor, about 120–300 rpm or about 160 rpm for a 5 gallon reactor, up to 200–800 rpm or about 350 rpm for a 2-L Buchi reactor. The 2-L Buchi may be run at up to about 800 rpm.

Regarding the parameter values for the second shear condition, greater mixing intensity is provided for the second shear condition relative to the first shear condition by for example the design of the mixing elements and the mixing rate in the second condition. The action of the mixing elements re-arranges the fluid such that it is mixed very uniformly in the mixing chamber. The mixer may be designed to operate at a fixed mixing rate of for example about 8000 rpm but this could be variable. The higher mixing rate implies more turbulent, intensive mixing. Thus, the combination of mixing element design and mixer speed ensures much more intensive mixing compared to the reactor (i.e., the vessel). One can determine the intensity of the two different shear conditions by measuring the mixer power, P, which is proportional to the mixer speed, N, the diameter of the mixing element D and a power number, $N_p$, which is a factor that is largely determined by the geometry of the mixing elements and mixer. The mixing power is determined by the following equation: $P = N_p N^3 D^5$. Calculation of mixing power using the equation is discussed in G. B. Tatterson, "Scaleup and Design of Industrial Mixing Processes", Chapter 2, McGraw-Hill, Inc. New York, N.Y., 1994, the disclosure of which is totally incorporated herein by reference. The mixing intensity may also be more rigorously determined by using computational fluid dynamics (CFD) which simulates the flow velocities in the mixers.

The length of time for maintaining the first shear condition and the second shear condition can vary with particular embodiments. For example, the time period for maintaining the first shear condition can range from about 6 to about 20 hours (or from about 6 to about 10 hours) and the time period for maintaining the second shear condition can range from about 2 to about 4 hours (or from about 2 to about 3 hours). The difference between the first period of time and the second period of time ranges for example from about 1 hour to about 5 hours, or from about 2 hours to about 4 hours. The first and second shear conditions can be maintained continuously, intermittently, or with shear conditions that vary with time.

The mixer may be a rotor-stator type homogenizer such as the IKA Dispax Reactor®, model DR 3-6/6A. Other types of mixers that can be used include for instance the Ultimaizer, Gaulin or Rannie homogenizers which involve passing the mixture through a small orifice at high pressures to disperse solids into a liquid.

Any suitable volume of the mixture is circulated through the mixer to be subjected to the second shear condition such as for example at least about 50% by volume of the mixture, particularly 100% by volume of the mixture. In embodiments, 100% by volume of the mixture is circulated through the mixer to be subjected to the second shear condition for a number of times ranging for instance from 1 to about 100 times, particularly from about 10 to about 50 times, and especially about 30 times. The number of times that the mixture circulates through the mixer are theoretical passes based on the flow rate into the mixer and the volume of the mixture in the vessel. To illustrate, if the flow rate of the mixture into the mixer is 40 L/min and the volume of mixture is 120 L in a 30 gal reactor, then the time it takes to empty the entire volume is 3 minutes (120 L divided by 40L/min). Thus, 1 theoretical pass is defined as taking 3 minutes. If the mixer maintains the second shear condition for 90 minutes, then the mixture can have about 30 theoretical passes through the mixer.

In the instant process, the temperature within the vessel and the mixer can be at any appropriate temperature ranging for example from room temperature (i.e., about 25 degrees C.) to about 180 degrees C., or from room temperature to above the glass transition temperature of the resin such as from about 10 to about 40 degrees above the glass transition temperature. For sodium sulfonated polyester resins, the temperature may be from about 45° C. to about 100° C. The temperature can be varied as needed during the process. An elevated temperature (i.e., above room temperature) may be employed during any time period or periods during the present process. For example, the agitating at the first shear condition may be performed at an elevated temperature during substantially all of the first period of time or during the entire first period of time. In embodiments, the second shear condition may be performed at an elevated temperature during substantially all of the second period of time or during the entire second period of time.

Adding the aggregating agent may be accomplished in any suitable manner such as at a steady rate, at an increasing rate, at a decreasing rate, or in stages (such as that employed in Toth et al., U.S. Pat. No. 6,395,445 B1), or even intermittently. The aggregating agent may be added at a steady rate ranging for example from about 0.1–50 g/min, particularly from about 1–10 g/min, in a 2-L reactor; about 20–400 g/min, particularly about 50–200 g/min, in a 5 gal reactor; and about 100–3000 g/min, about 100–1500 g/min, in a 30 gal reactor. In embodiments, the aggregating agent is added under conditions of both agitation and a temperature above the glass transition temperature of the resin.

In the instant process, the resin particles undergo both aggregation and coalescence. Such aggregation and coalescence may occur sequentially in two distinct stages or may occur almost simultaneously where there is absent two distinct stages.

After the resin particles have been aggregated and coalesced during the instant process to the desired size (and optionally incorporating the colorant and any other desired components), the resulting particles (referred herein as "Resulting Particles") can be subsequently cooled to a temperature below the glass transition temperature of the resin and collected.

Any resin suitable for chemical aggregation processes may be used as the resin particles in the present process including for instance polyester, sytrene-acrylate, polyamides and polyesterimides.

In embodiments, the process of the present invention is a surfactant free chemical method wherein polyester particles, such as sulfopolyester particles, are aggregated with an ionic salt aggregating agent, particularly zinc acetate, under controlled mixing conditions.

In embodiments, the aggregating agent is added into a mixture of a latex of the resin particles and a colorant dispersion.

The latex of resin particles may be formed by forming for example a polyester, such as a sodium sulfonated polyester, resin in water with heating the resin in water at a temperature of from, for example, about 45° C. to about 90° C. The polyester resin selected may contain sulfonated groups thereby rendering them dissipatable, that is, they form spontaneous emulsions in water without the use of organic solvents, especially above the glass transition temperature, Tg, of the polyester resin. The latex of suspended resin particles is comprised of particles which have an average size of from, for example, about 5 to about 500 nm and particularly about 10 to about 250 nm in volume average diameter, as measured by any suitable device such as, for example, a NiComp sizer. The resin particles may comprise, for example, about 5 to about 40 percent by weight of the latex emulsion.

The polyester, such as a sulfonated polyester, may be formed from any suitable acid and alcohol. In embodiments, the polyester is derived from one or more terephthalates and one or more glycols. For example, the polyester may be derived from a reaction that includes, for example, three glycol components. In embodiments, the polyester is a sulfonated polyester derived from a reaction of dimethylterephthalate, sodium dimethyl 5-sulfoisophthalate, propanediol, diethylene glycol and dipropylene glycol.

Additional examples of sulfonated polyesters which may be used in the present invention include those illustrated in U.S. Pat. Nos. 5,593,807 and 5,945,245, the disclosures of which are totally incorporated herein by reference, for example including sodium sulfonated polyester, and more specifically, a polyester such as poly(1,2-propylene-sodio 5-sulfoisophthalate), poly(neopentylene-sodio 5-sulfoisophthalate), poly(diethylene-sodio 5-sulfoisophthalate), copoly(1,2-propylene-sodio 5-sulfoisophthalate)-copoly-(1,2-propylene-terephthalate-phthalate), copoly(1,2-propylene-diethylene-sodio 5-sulfoisophthalate)-copoly-(1,2-propylene-diethylene-terephthalate-phthalate), copoly(ethylene-neopentylene-sodio 5-sulfoisophthalate)-copoly-(ethylene-neopentylene-terephthalate-phthalate), and copoly(propoxylated bisphenol A)-copoly-(propoxylated bisphenol A-sodio 5-sulfoisophthalate).

The sulfonated polyesters may in embodiments be represented by the following formula, or random copolymers thereof wherein the n and p segments are separated.

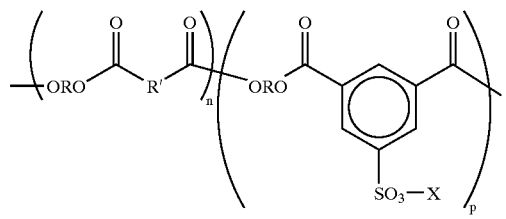

wherein R is an alkylene of, for example, from 2 to about 25 carbon atoms such as ethylene, propylene, butylene, oxyalkylene diethyleneoxide, and the like; R' is an arylene of, for example, from about 6 to about 36 carbon atoms, such as a benzylene, bisphenylene, bis(alkyloxy) bisphenolene, and the like; and p and n represent the number of randomly repeating segments, such as for example from about 10 to about 10,000. X is typically sodium but may be another alkaline earth metal such as lithium, potassium, or rubidium. The alkali sulfopolyester possesses, for example, a number average molecular weight (Mn) of from about 1,500 to about 50,000 grams per mole and a weight average molecular weight (Mw) of from about 6,000 grams per mole to about 150,000 grams per mole as measured by gel permeation chromatography and using polystyrene as standards.

The liquid can be for example water, an organic fluid, or a mixture of water and an organic fluid in any suitable ratio. The organic fluid may be for example an alcohol. The degree of solubility/insolubility of the resin particles, aggregating agent, and the colorant in the liquid can vary in embodiments of the present invention.

In embodiments, to this mixture of resin particles in liquid is added, with controlled agitation/mixing, a colorant dispersion containing, for example, about 5 to about 50 percent of predispersed colorant in a liquid such as water. The colorant may be, for example, dyes, pigments, mixtures thereof, mixtures of pigments, mixtures of dyes, and the like. The colorant may have a color of, for example, black (e.g., carbon black), cyan, yellow, magenta, or mixtures thereof. The colorant may have a mean colorant size ranging for example from about 50 to about 150 nanometers.

Various known colorants or pigments may be in an effective amount of, for example, from about 1 to about 25 percent by weight of the Resulting Particles, and particularly in an amount of from about 1 to about 15 weight percent of the Resulting Particles. A suitable black pigment that may be used is, for example, carbon black like REGAL 330™ and the like. As colored pigments, there can be selected pigments of cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E. D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E. I. DuPont de Nemours & Company, and the like. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments of the invention, the colorant is comprised of a predispersed pigment such as are commercially available. Although dry pigments may be used in the invention, additional processing requirements, for example including the use of a homogenizer, may be needed in embodiments. Examples of pigment dispersions include, for example, the FLEXIVERSE series and the SUNSPERSE series of pigment dispersions from Sun Chemical. Some of these are Blue 15:3 (BFD-1121), Blue 15 (BFD-1149), Blue 61 (BFD-9516), Red 81:2 (RFD 9664), Red 22 (RFD-4241), Yellow 14 (YFD-1123), Yellow 17 (YFD-4249), Black Regal 660 (LFD-4343), Green 7 (GFD-1151), Green 36 (GHD-7114), Violet 19 (QFD-1180) and Violet 23 (VFD-1157).

These colorants, especially pigments, selected are present in various effective amounts, and generally from about 1 weight percent to about 65 weight and particularly from about 2 to about 12 percent, of the Resulting Particles.

In some instances, colorants, such as pigments available in the wet cake form or concentrated form containing water, can be easily dispersed utilizing a homogenizer or stirring. In other embodiments, pigments are available in a dry form, whereby a dispersion in water may be effected by, for example, microfluidizing using, for example, an M-110 microfluidizer and passing the pigment dispersion from about 1 to about 10 times through the chamber of the microfluidizer, or by sonication, such as using a Branson 700 sonicator, or by a rotor-stator type of in-line homogenizer, for example, IKA or Quaddro and Kady Mill batch homogenizer.

The total amount of aggregating agent used for the aggregation is from, for example, about 5% to about 20% by weight of resin. The aggregating agent may be added alone or as a solution/dispersion in for example water, the solution/dispersion containing on the order of, for example, about 1% to about 20% by weight of the aggregating agent. The water may be deionized water.

In embodiments, a dilute solution of aggregating agent may be used to optimize particle aggregation time with as little fouling and coarse particle formation as possible. For example, fouling may be decreased to <0.1% when an about 1% to about 10%, particularly about 3% to about 5%, zinc acetate solution is used as the aggregating agent solution. Thus, the aggregating agent solution may contain for example about 5% by weight or less aggregating agent, or 3% by weight or less. Further, it may be possible to add a dip tube into the vessel in order to reduce foaming and more intimately mix the aggregating agent with the resin particles, and thus further eliminate fouling.

In embodiments, the aggregating agent is zinc acetate. When zinc acetate is used as the aggregating agent, addition of the zinc acetate may cause complexation between the $Zn^{2+}$ ions and ions on the resin such as $SO^{3-}$ ions. The close contact, temperature and ionic strength of the media cause the particles to aggregate into larger particles. Particle growth stops by cooling the mixture to a temperature below the resin Tg.

Any other aggregating agent capable of causing complexation as discussed above might also suitably be used. Both alkali earth metal or transition metal salts can be utilized as aggregating agents. In embodiments, examples of the alkali (II) salts that can be selected to aggregate the sodio sulfonated polyester colloid with a colorant to enable the formation of the toner composite are selected from beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, and barium iodide. Examples of transition metal salts or anions include acetates, acetoacetates, sulfates of vanadium, niobium, tantalum, chromium, molybdenum, tungsten, manganese, iron, ruthenium, cobalt, nickel, copper, zinc, cadmium, silver or aluminum salts such as aluminum acetate, aluminum polyaluminum chloride, aluminum halides, mixtures thereof and the like, and wherein the concentration thereof is optionally in the range of from about 0.1 to about 5 weight percent by weight of water. It is believed that the alkali (II) or transition metal ion exchanges with the monovalent sodium ion of the sulfonated polyester resin colloid.

The process of the present invention can be considered in embodiments a substantially surfactant free chemical method wherein for example sulfopolyester particles are aggregated with aggregating agents in the presence of a colorant dispersion by heating wherein during the heating no surfactants are utilized. The process generates Resulting Particles with, for example, an average particle volume diameter of from about 1 to about 15 and particularly about 3 to about 7 microns as determined by, for example, a Coulter Counter. During the present process, the components of the mixture aggregate and coalesce together to form the Resulting Particles. The size and size distribution of the Resulting Particles can be controlled by, for example, the amount of aggregating agent added and by the temperature. The particle size may be monitored by taking samples from the vessel and evaluating with for example a Coulter Counter.

The Resulting Particles obtained after aggregation and coalescence can be subjected to washing/rinsing with, for example, water to remove residual aggregating agent, and drying. In addition, the Resulting Particles may be subjected to screening and/or filtration steps to remove undesired coarse particles.

Surface additives may be added to the Resulting Particles after isolation by, for example, filtration, and then optionally followed by washing and drying. Where the Resulting Particles are toner particles, suitable external surface additives include, for example, metal salts, metal salts of fatty acids, colloidal silicas, titanium oxides, mixtures thereof, and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Exemplary additives include zinc stearate, silicas, such as AEROSIL R972®, and other silicas available from Cabot Corporation Degussa Company. These additives can be selected in amounts of, for example, from about 0.1 to about 2 percent, and which additives can be incorporated during the aggregation, or blended into the formed toner product. The toner may also include known charge additives in effective amounts of, for example, from about 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of each of these patents being totally incorporated herein by reference, negative charge enhancing additives like aluminum complexes, and the like. Other known positive and negative enhancing charge additives may also be selected.

The process of the present invention can be used to produce Resulting Particles within any sized reactor, and is thus commercially significant. Scaling up of the process from bench reactors to larger reactors can be readily achieved by practitioners in the art. One preferred scale-up rule herein is based upon matching the power/volume requirements for the two reactors. Such a scale-up rule effectively predicts the required agitation rate even when using different impellers or different number of impellers.

The aggregation process of the present invention has a number of advantages when compared to the same process without the second shear condition created by the mixer. In embodiments, the advantages may include:

(1) Less coarse/fouled material, typically reduced from about 10% to less than 1% of theoretical yield. Yield is higher and disposal costs are reduced by the reduction of undesirable coarse/fouled material.

(2) The use of the mixer does not alter the particle growth time or affect the shape of the particles.

(3) The effect of pigment type and loading is muted when the mixer is used. Previously, the particle growth time and coarse/fouled fraction may vary with pigment type and loading. When the mixer was used during the aggregation process, the particle growth times were about the same regardless of pigment type and loading. Also previously, certain pigmented toners may have more coarse/fouled material. With the mixer, the coarse/fouled material fraction remained nearly the same regardless of pigment type or loading.

(4) The use of the mixer may allow for higher pigment incorporation and loadings in the toner.

Developer compositions can be prepared by mixing the toners obtained with the process of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 15 percent toner concentration. The carrier particles may also be comprised of a carrier core with a polymer coating, or coatings thereover, and dispersed therein a conductive component like a conductive carbon black in an amount, for example, of from about 5 to about 60 weight percent.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

COMPARATIVE EXAMPLE 1

Preparation of sulfonated polyester and polyester resin emulsion was done in the same manner as that described by Toth et al. in U.S. Pat. No. 6,395,445 B1. A control experiment was done first without the use of the homogenizer. A 2-L stainless steel Buchi reactor was set up with two pitched blade (P4) impellers (diameter=2") spaced one diameter apart with an impeller to tank diameter ratio of 0.5. Two baffles were also placed in the reactor. After adding 1400 g of a 12 wt % sulfonated polyester (SPE) emulsion and 14.22 g of cyan pigment dispersion (47.1% solids) to the reactor, agitation was started at 700 RPM and the temperature was 58° C. A 5% zinc acetate solution (16.8 g of zinc acetate dissolved in 319.2 g of de-ionized water) was added at a rate of 9.9 mL/min for 23 minutes after which the addition rate was decreased to 1.1 mL/min. Agitation was decreased to 500 RPM after 1 hour and decreased further to 350 RPM 90 minutes after zinc acetate addition began. Zinc acetate addition was completed after 140 minutes of aggregation. Samples were removed from the reactor every hour and the particle size measured with a Coulter Counter®. After 6.0 hour, the target particle size was attained ($D_{50}$=6.07 $\mu$m, GSD=1.19). After cooling to below 40° C., the mixture was sieved through 150 $\mu$m and 38 $\mu$m sieves. Material remaining on the sieves was termed coarse while any material remaining in the reactor was considered fouled. The coarse plus fouled fraction for this control experiment was 5.6% of theoretical yield. After sieving, the toner mixture was filtered and washed and re-slurried twice with 1.5 L portions of de-ionized water (DIW). The toner was dried in a freeze-dryer for several days and then in a vacuum oven to reduce the toner moisture content to below 1%. The dried toner was weighed to complete the mass balance.

EXAMPLE 1

The procedures of Comparative Example 1 were repeated except for an IKA Works UTL25 Basic Ultra-Turrax In-line Disperser/Homogenizer (rotor-stator type) which was set up with a 2-L stainless steel Buchi reactor in a configuration similar to that shown in FIG. 1. The reactor configuration consisted of two P4 (45°) impellers (diameter=2") spaced one diameter apart from each other. The impeller diameter: tank diameter was 0.5. Two baffles were also placed in the reactor. Flexible teflon tubing was used to feed the mixture into the homogenizer and from the homogenizer exit to the return port on the reactor. A separate port on the reactor was used to feed the zinc acetate solution into the mixture. Temperature control for the reactor was supplied by an external bath to the reactor jacket.

To the reactor was added 1400 g of sulfonated polyester resin (batch SPE-3) emulsion in de-ionized water (DIW). The emulsion concentration was 12% SPE-3. Then 14.22 g of cyan pigment dispersion (47.1% solids) was added and agitation began at 700 RPM. The desired pigment loading in the toner was 4%. The reactor was heated to a temperature of 58° C. A 5% solution of zinc acetate was prepared by dissolving 16.8 g of zinc acetate into 319.2 g of DIW at room temperature in a beaker with a magnetic stirrer. This solution was placed on a balance and connected to an HPLC pump capable of delivering up to 9.9 mL/min. The weight loss was used to monitor the flow rate of zinc acetate solution. Once the desired reactor temperature was achieved, the bottom valve from the reactor was opened and the pumping of the zinc acetate solution at 9.9 mL/min began. The homogenizer was immediately started at minimum speed (8000 RPM). The addition of zinc acetate was completed in 37 minutes. The homogenizer continued to operate until 1 hour after zinc addition began. The bottom valve from the reactor to the homogenizer was closed and any remaining mixture in the homogenizer loop was drained and immediately placed back into the reactor. The agitation in the reactor was then reduced to 500 RPM for 1 hour and then reduced to 425 RPM for the rest of the experiment. Particle size measurements were done with a Coulter Counter® particle size analyzer to track the particle growth. The target particle size was 6 μm and this was achieved after 6.5 hour of particle growth ($D_{50}$=5.99 μm). The geometric size distribution (GSD) was low (1.2) and typical of a polyester chemical aggregation process done without the homogenizer. After sieving, the coarse/fouled material fraction was reduced to 2.6% with the aid of the homogenizer compared to 5.6% without the homogenizer.

COMPARATIVE EXAMPLE 2

A toner was prepared with a green pigment at a 13.3% pigment loading in a 2-L Buchi reactor without a homogenizer. The reactor was set with two pitched blade (P4) impellers (diameter=2") spaced one diameter apart with an impeller to tank diameter ratio of 0.5. Two baffles were also placed in the reactor. After adding 1400 g of a 12 wt % sulfonated polyester (SPE) emulsion and 49.5 g of green pigment dispersion (51.6% solids) to the reactor, agitation was started at 700 RPM and the temperature was 58° C. A 5% zinc acetate solution was prepared (16.8 g of zinc acetate dissolved in 319.2 g of de-ionized water) was added at a rate of 9.9 mL/min for 23 minutes after which the addition rate was decreased to 1.1 mL/min. Agitation was decreased to 500 RPM after 1 hour and decreased further to 350 RPM 90 minutes after zinc acetate addition began. Zinc acetate addition was completed after 145 minutes of aggregation. Samples were removed from the reactor every hour and the particle size measured with a Coulter Counter®. After 7.0 hour, the target particle size was attained ($D_{50}$=6.09 μm, GSD=1.25). The mixture was cooled to below 40° C. and then discharged through 150 μm and 38 μm sieves. Material remaining on the sieves was termed coarse while any material remaining in the reactor was considered fouled. The coarse plus fouled fraction for this control experiment was 17.5% of theoretical yield.

After sieving, the toner mixture was filtered and washed and re-slurried twice with 1.5 L portions of DIW. The toner was dried in a freeze-dryer for several days and then in a vacuum oven to reduce the toner moisture content to below 1%. The dried toner was weighed to complete the mass balance.

EXAMPLE 2

An IKA in-line homogenizer (IKA Works, Dispax Reactor®, Model DR 3-6/6A, 5 HP) was assembled with three rotor-stator units in the homogenizer. The homogenizer consisted of one fine and two super-fine rotor-stator sets from the inlet. The motor turns the drive-shaft at approximately 8000 RPM. The homogenizer also was jacketed and cooled with water flowing through ¼" copper piping at a rate of about 0.5–1 gal/min to prevent excessive heating. The reactor configuration for the 30 gal pilot plant reactor was geometrically similar to the configuration used in the 2-L Buchi. The reactor consisted of two 11" diameter P4 (45°) impellers spaced 11" apart. The impeller diameter: tank diameter was 0.5. Two baffles were also placed inside the reactor. The homogenizer loop was identical to that shown in FIG. 1 except no pump was necessary. The flow rate was approximately 40 kg/min. There was some heating in the reactor caused by the homogenizer. The water temperature increased by about 10° C. in the reactor when the homogenizer was on. For actual experiments, cascade control would be used to fix the reactor temperature and prevent any excessive heating.

After setting up the homogenization loop, the reactor was filled with 88.5 kg of 12% SPE emulsion in DIW and 3.15 kg of green pigment dispersion (solids loading in pigment=51.6%). The desired pigment concentration in the toner was 13.3%. Agitation was begun at 105 RPM and the reactor heated up to 58° C. Cascade control was used to keep the reactor temperature at 58° C. at all times. A 10 gal portable tank was filled with 25.7 kg of a freshly prepared 5% zinc acetate solution with DIW. Once the desired temperature was reached, the homogenizer was started and the zinc acetate solution was added at approximately 540 g/min for 30 minutes by throttling the ball valve from the reactor bottom. A total of 15.9 kg of solution was added after the first 30 minutes. The position of the ball valve was then adjusted to decrease the flow rate of zinc acetate solution into the homogenizer. All 25.7 kg of solution from the tank was added after 100 minutes of aggregation. The homogenizer was allowed to continue working for an additional 5 minutes after all of the zinc acetate solution had been added. It was then turned off and the bottom valve and return valves were closed. Mixture remaining in the loop was drained and poured back into the reactor through a sampling port. After 260 minutes of aggregation, additional aggregating agent solution was added to accelerate particle growth. An additional 2.4 kg of 5% zinc acetate solution was added over a 20 minute period from the tank without the use of the homogenizer. The solution was pumped in after pressurizing the tank to 50 kPa of nitrogen. After 360 minutes, the agitation rate was decreased to 100 RPM. At 420 minutes, an additional 2.4 kg of 5% zinc acetate solution was added over a 30 minute period. Agitation was further reduced to 95 RPM after 480 minutes of aggregation and decreased further to 90 RPM after 540 minutes of aggregation. The toner finally reached the target particle size of 5.80+/−0.2 μm (5.92 μm) after 600 minutes of aggregation. The GSD of the toner particles of this example was considerably lower, being about 1.19. The reactor was cooled and the mixture discharged through 25 μm nylon filter bags to catch the coarse particles.

Very little coarse material was trapped in the filter bags. The mixture was collected in plastic pails and then transferred to a 24" drum filter. After removing the mother liquor, the wet cake was re-slurried and washed four times with 90 kg portions of DIW. Based on the moisture content and mass of the wet cake, the expected yield of dry toner was 11.8 kg (96.3% of theoretical). After the reactor was lowered, the fouled material remaining was collected and weighed in addition to the coarse material trapped in the filter bags. The amount of coarse/fouled material was noticeably decreased for the 30 gal batch with the homogenizer compared to the 2-L batch without homogenization. Only 1.2% of the batch from the 30 gal reactor was coarse/fouled material compared to 17.5% for the 2-L batch.

We claim:

1. A process for the preparation of toners comprising:
agitating a mixture including a liquid and a plurality of resin particles within a vessel at a first shear condition;
circulating a portion of the mixture from the vessel through a mixer;
adding not all at once an aggregating agent for the resin particles and mixing the aggregating agent with the circulating mixture portion within the mixer at a second shear condition more intensive than the first shear condition to result in a post-mixer circulating composition; and
returning the post-mixer circulating composition to the vessel wherein the post-mixer circulating composition undergoes the agitating at the first shear condition.

2. The process of claim 1, wherein the mixture further includes a colorant.

3. The process of claim 1, wherein the resin is a polyester.

4. The process of claim 1, wherein the resin is a sodium sulfonated polyester.

5. The process of claim 1, wherein the aggregating agent is zinc acetate.

6. The process of claim 1, wherein the mixer is a rotor-stator type homogenizer.

7. The process of claim 1, wherein 100% by volume of the mixture is circulated at least once through the mixer to be subjected to the second shear condition.

8. The process of claim 1, wherein 100% by volume of the mixture is circulated through the mixer to be subjected to the second shear condition for a number of times ranging from 1 to 100 times.

9. The process of claim 1, wherein the first shear condition includes a mixing speed ranging from about 100 rpm to about 1,000 rpm.

10. The process of claim 1, wherein the second shear condition includes a mixing speed ranging from about 6,000 rpm to about 10,000 rpm.

11. The process of claim 1, wherein the first shear condition includes a slower mixing speed and the second shear condition includes a faster mixing speed and wherein the difference in the mixing speeds ranges from about 3,000 rpm to about 10,000 rpm.

12. A process for the preparation of toners comprising:
agitating a mixture including water, a plurality of resin particles, and a colorant within a vessel at a first shear condition;
circulating 100% by volume of the mixture from the vessel through a mixer;
adding not all at once an aggregating agent for the resin particles and mixing the aggregating agent with the circulating mixture portion within the mixer at a second shear condition more intensive than the first shear condition to result in a post-mixer circulating composition; and
returning the post-mixer circulating composition to the vessel wherein the post-mixer circulating composition undergoes the agitating at the first shear condition.

13. The process of claim 12, wherein the resin is a polyester.

14. The process of claim 12, wherein the mixer is a rotor-stator type homogenizer.

15. The process of claim 12, wherein 100% by volume of the mixture is circulated through the mixer to be subjected to the second shear condition for a number of times ranging from 1 to 100 times.

16. The process of claim 12, wherein the first shear condition includes a slower mixing speed and the second shear condition includes a faster mixing speed and wherein the difference in the mixing speeds ranges from about 3,000 rpm to about 10,000 rpm.

* * * * *